United States Patent [19]

Scherfenberg

[11] 4,252,479
[45] Feb. 24, 1981

[54] ROTARY DIVERTER VALVES

[75] Inventor: Jerry W. Scherfenberg, Excelsior, Minn.

[73] Assignee: Dynamic Air Inc., St. Paul, Minn.

[21] Appl. No.: 66,530

[22] Filed: Aug. 15, 1979

[51] Int. Cl.³ .............................................. B65G 53/56
[52] U.S. Cl. ................................................. 406/182
[58] Field of Search ................. 406/182, 181; 137/874

[56] References Cited

U.S. PATENT DOCUMENTS

| | | | |
|---|---|---|---|
| 2,690,931 | 10/1954 | Baresch | 406/182 |
| 2,825,604 | 3/1958 | Sebestyen | 406/182 |
| 3,536,098 | 10/1970 | Cunningham | 406/182 |

FOREIGN PATENT DOCUMENTS

| | | | |
|---|---|---|---|
| 609423 | 9/1948 | United Kingdom | 406/182 |
| 1382347 | 1/1975 | United Kingdom | 406/182 |

*Primary Examiner*—James L. Rowland
*Attorney, Agent, or Firm*—Jacobson and Johnson

[57] ABSTRACT

A pneumatic conveyor tube switch operable for diverting materials from a pneumatic conveying line to secondary locations with the rotating diverter valve including a band bearing and a pair of inflatable seals to permit rotation of a central tube and to confine the material within the pneumatic conveying lines of the conveying system.

7 Claims, 3 Drawing Figures

ROTARY DIVERTER VALVES

BACKGROUND OF THE INVENTION

1. Field of the Invention

This invention relates generally to rotary diverter valves and, more specifically, to improvements to bearings and seals for rotary diverter valves.

2. Description of the Prior Art

One of the uses of pneumatic conveyor lines is to transport granular materials from one location to another, oftentimes with selective intermediate diversion of the materials into bins or secondary pneumatic conveying systems. To switch or divert the material from the pneumatic conveyor line into the secondary systems requires a pneumatic switch which will divert the material to the secondary system and some means to seal the connection points on the two systems so that the transported material will not escape into the environment. One of the problems inherent with prior art pneumatic switching devices has been the difficulty in obtaining a good seal as well as obtaining accurate alignment of the conveying tubes of the two systems. If accurate alignment of the conveyor tubes is not maintained, the tubes may become damaged by the fast moving material or leakage of the material may occur. Still other problems inherent with diverting units are that they must withstand large forces because of the high momentum generated by the fast movement of heavy material in the conveyor tubes. The large force makes it difficult to properly seal the pneumatic conveying tubes to the pneumatic switches.

A typical prior art diverter valve is shown in the Baresch U.S. Pat. No. 2,690,931. Baresch uses a pneumatic apparatus for conveying powdered granular material to either of two discharge conducts. Baresch shows no seals on the discharge conduit to prevent flow past the junction.

Still another type of device is shown in the Yates Great Britain patent specification No. 229,844. Yates shows the ends of several pipes around a common circle whose center is on the axis of a single pipe that swivels thereabout.

Still another type of changeover means for pneumatic lines is shown in the Sebestyn U.S. Pat. No. 2,825,604. Sebestyn shows a changeover means having expandable rings to seal the gap between the tube pipes.

A further prior art apparatus for distributing material is shown in the Great Britain specification No. 1,382,347 which shows a distributer for material conveyed by gravity or pneumatically. The Great Britain patent shows a platform with selected pipe outlets and a platform having a pipe which is alignable therewith. The patent shows at least one annular inflatable joint to provide a seal between the pipe and the selected outlet.

The concept of other types of inflatable seals is shown in the French Pat. No. 7,413,252 which shows an inflatable seal for use around doors, etc.

The German prior art patent No. 2,051,117 shows a system in which one or more sealing pistons are forced by the internal pressure into sealing against the outlet ports not in use.

The present invention is an improvement to the above-identified prior art devices. More specifically, the present invention provides a positionable unit that includes a band bearing and a pair of inflatable seals that permit sealing the rotatable conveyor tube to the inlet and outlet.

SUMMARY OF THE INVENTION

Briefly, the invention comprises improvements in a multiposition switch for a pneumatic conveying system. The switch mechanism includes a rotatable tube having a band bearing support and a pair of inflatable seals that provide an air-tight seal on both ends of the rotatable tube.

DESCRIPTION OF THE PREFERRED EMBODIMENT

Figure 1:
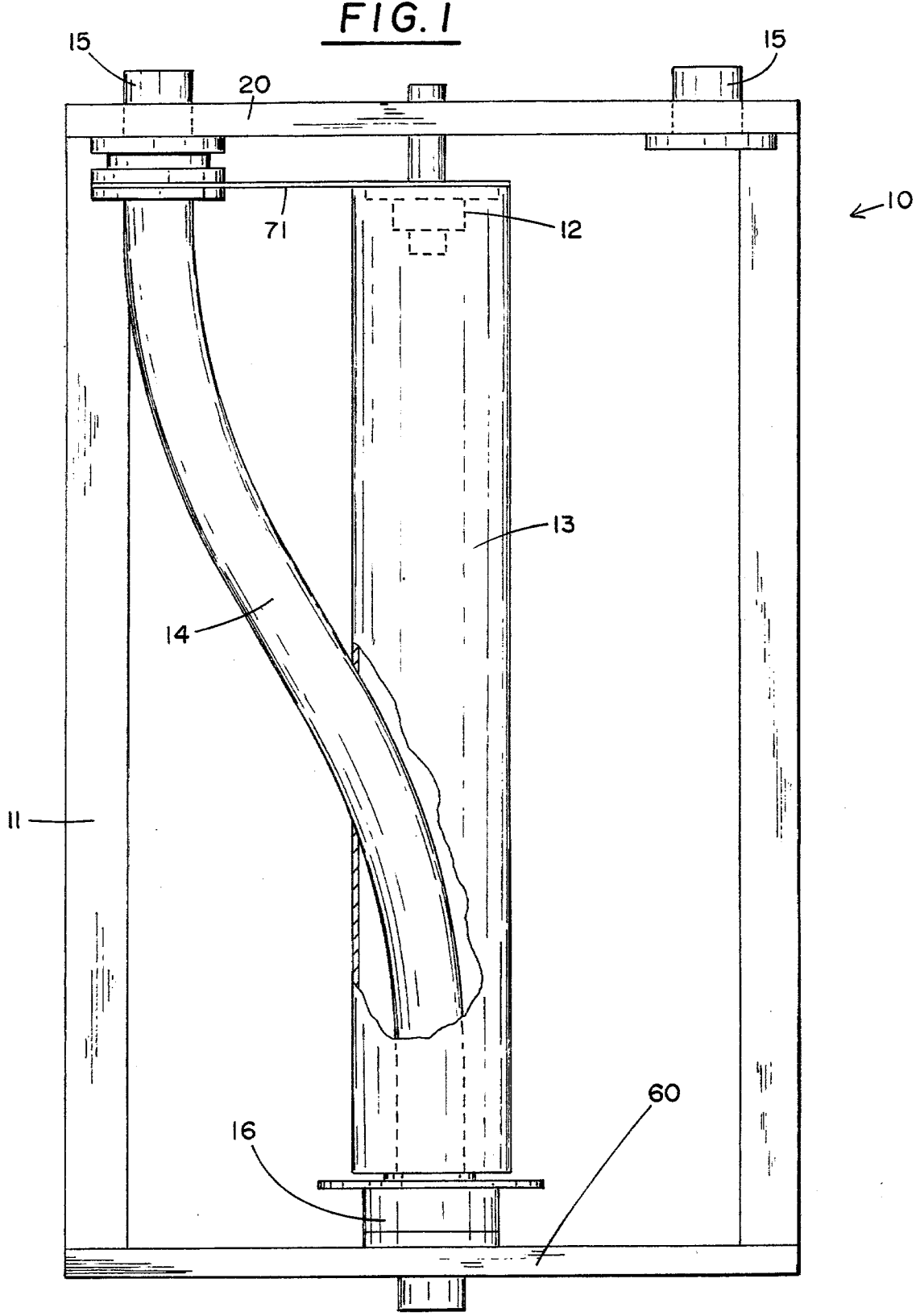
FIG. 1 shows a multiposition switching mechanism.

Referring to FIG. 1, reference numeral 10 generally designates the multiposition switching unit of the present invention. The multiposition switching unit comprises a main frame 11 having an inlet 16 on the bottom side and a plurality of discharge outlets 15. Inlet 16 would normally be connected to the primary pneumatic conveying line and discharge outlet 15 would be connected to the secondary pneumatic system or storage areas. In the embodiment shown in FIG. 1 there are shown two secondary discharge outlets located in frame 11; however, the number of secondary discharge outlets could be increased or decreased.

Centrally located in unit 10 is a rotatable bearing support 12 which rotatably supports a main pipe 13 which is connected to an angled conveyor tube 14. Conveyor tube 14 rotates around a central axis through bearing 12. Bearing 12 is a conventional thrust bearing that withstands axial thrust while permitting rotation about the thrust axis.

The rotation of tube 14 is accomplished by means and drive mechanism (not shown). In operation one can position tube 14 with respect to any particular secondary discharge port. In the present embodiment, the end of tube 14, which is attached to a support plate 71, is shown located in alignment with left discharge port 15.

The present invention includes an internal rotary sealing unit and bearing support which are located in inlet 16. Inlet 16 is shown in section in FIG. 2. Similarly, FIG. 3 shows in section the sealing mechanism in outlet 15. In order to more fully appreciate the sealing mechanism, reference should be made to FIG. 2 which shows the inlet sealing mechanism in an enlarged sectional view.

Figure 2:
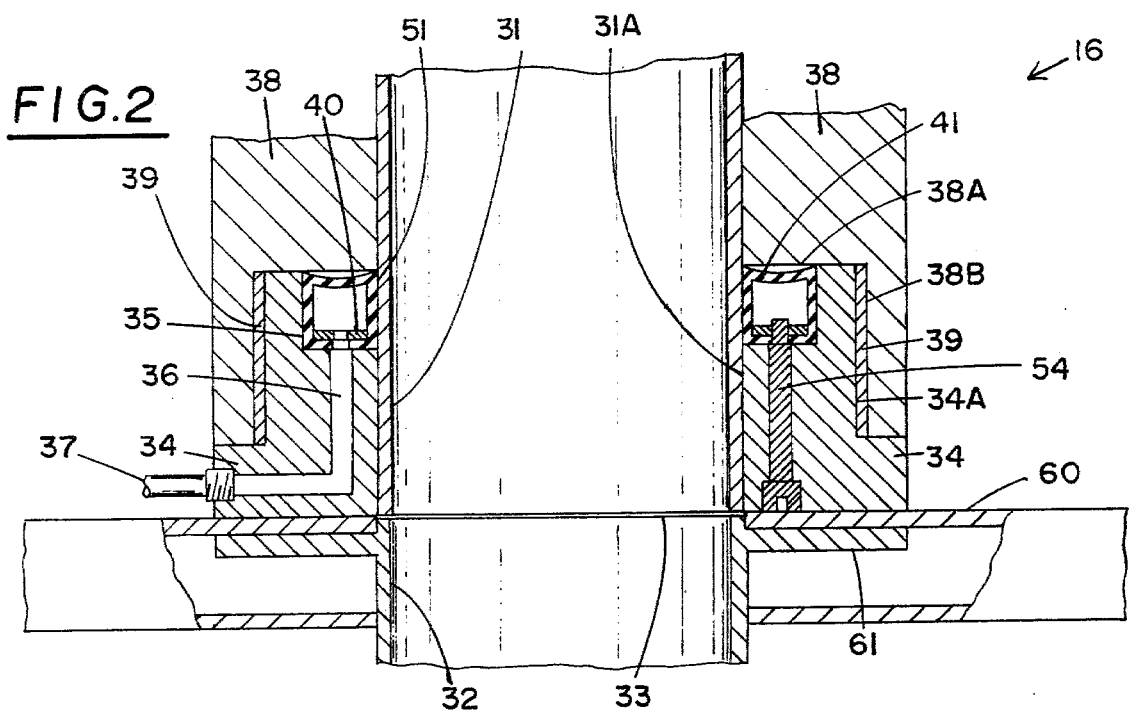
FIG. 2 shows a sectional view of the swiveling end of the multiposition switching mechanism.
Figure 3:
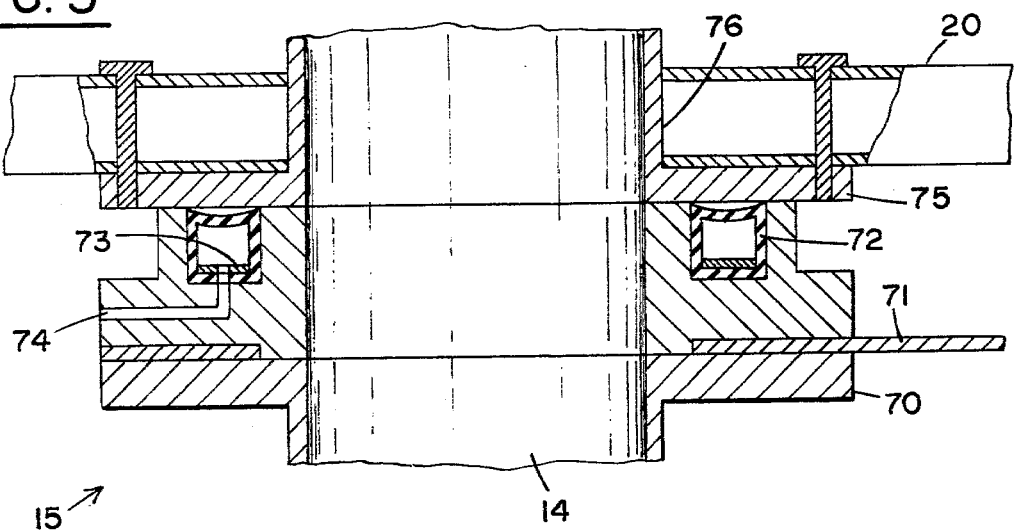
FIG. 3 shows a cross section of the positionable end of the multiposition switching mechanism.

Referring to FIG. 2, reference numeral 31 designates the interior surface of the rotatably conveying tube 14. Similarly, reference numeral 32 designates the interior surface of the inlet. In operation, surfaces 31 and 32 must be maintained in concentric alignment with each other. The gap between interior surface 31 and interior surface 32 is denoted by reference numeral 33.

Attached integrally around conveying tube 14 is an annular L-shaped shoulder 38 with the longer portion extending along the conveying tube 14 but located in a spaced relationship to conveying tube 14. Member 38 may be suitably welded or fastened to conveying tube 14 so as to provide a rigid connection thereto. Located connected to plate 60 is a similarly L-shaped member 34 which is rigidly attached to plate 60 through means not shown. Member 34 is not rotatable; however, member 34 mates with member 38 to provide rotatable engagement with member 38 but to prevent lateral displacement of member 38. Located between members 38 and member 34 is a band bearing surface material 39 which engages surface 38B and surface 34A. The material used hereon is a thin band of polytetrafluroethylene or the like which forms a low friction support for swiveling conveyor pipe 14 and member 38 around stationary member 34. The band bearing has been found to work extremely well. In addition, the band bearing eliminates the necessity for manufacture of large bearings for use with large conveyor tubes.

Located on the inside of member 34 is the exterior surface of conveying tube 14 which is designated by reference numeral 31A (FIG. 2). Surface 31A is in close tolerance with the inner surface on member 34 usually on the order of no more than 0.010" clearance.

In order to prevent material from discharging between surface 31A and past the inside of member 34 there is located at the corner of member 34 an annular inflatable sealing member 41 which contains a circular flange 40 which is fastened to member 34 by a set of cap screws 54 which are spaced around circular flange 40. Located in fluid communication with the internal annular passage in inflatable seal 41 is an inlet 37 for supplying pressurized gas into passage 36 to inflate seal 41. In the inflated condition the concave top surface of seal 41 expands upward to engage surface 38A and laterally to engage exterior surface 31A of tube 14. In this position the seal imparts a sealing thrust in mutual perpendicular directions thereby making it extremely difficult for any material to leak past the junction between members 34 and surface 14. While seal 41 is shown at the top corner of member 38, it could also be placed at the lower inside corner of member 38.

Referring to FIG. 3, seal 72, which is identical to seal 41, is shown in the outlet end; however, the bearing support is not used. Instead an annular stationary member 76, which mounts in frame 20, provides a flat sealing surface 75. The rotating end of conveying tube 14 is connected to plate 71. Located attached around conveyor tube 14 is an annular housing 70 having an inflatable seal 72 therein. Holding seal 72 in position is a circular flange 73 which is held in position within housing 70 through cap screws (not shown). Located in housing 70 is an air inlet 74 for pressurizing inflatable seal 72 to expand the curved top surface of seal 72 into sealing engagement with surface 75. Thus, it can be appreciated that the present invention used identical seals in both the inlet and the outlet end of the rotary diverter valve.

The above arrangement has been found to provide a conveying tube with a maintenance-free bearing support which is virtually free of jamming.

I claim:

1. A diverter for use in a pneumatic conveying system comprising:
    an inlet for introducing a material to be pneumatically transported through said diverter;
    a plurality of secondary outlets to receive material from said inlet;
    a conveying member located intermediate said inlet and said plurality of secondary outlets, a main plate connected to said conveying member, said conveying member having an inlet end and an outlet end;
    a rotatable support, said main plate and said rotatable support coacting to rotatably support said conveying member, said conveying member rotatably positionable so that one end of said conveying member is in alignment with said inlet and the other end is positionable with respect to one of said plurality of secondary outlets;
    a support member located at said inlet end of said conveying member, said support member having a band bearing thereon;
    said band bearing located at said inlet end of said conveying member, said band bearing comprising a layer of low frictional material, said low frictional material forming a rotational support to permit said inlet end of said conveying member to rotate thereabout;
    an inflatable annular seal, said inflatable seal positioned between the junction of said support member and said conveying member to provide a seal to prevent leakage of material between the junction of said support member with said conveying member.

2. The invention of claim 1 wherein said seal has at least two mutually perpendicular surfaces which when inflated provide a sealing surface against two mutually perpendicular surfaces.

3. The invention of claim 2 wherein said seal has an annular opening therein for inserting a flange therein; said flange operable to hold said seal in position in said conveying system.

4. The invention of claim 3 wherein at least one of the surfaces of said inflatable seal has a concave surface when in a deflated condition.

5. The invention of claim 4 wherein said conveying system has an annular seal on said outlet.

6. The invention of claim 5 wherein said annular seals include means for pressurizing said seals from an external source.

7. A diverter for use in a pneumatic conveying system;
    an inlet for introducing a material to be pneumatically transported through said diverter;
    a plurality of secondary outlets to receive material from said inlet;
    a conveying member located intermediate said inlet and said plurality of secondary outlets;
    said conveying member having an inlet end and an outlet end;
    a rotatable support, said rotatable support operable for rotatably supporting said conveying member, said conveying member rotatably positionable so that said inlet end of said conveying member is in alignment with said inlet and said outlet end is positionable with respect to one of said plurality of secondary outlets;
    a support member located at said inlet end of said conveying member, a band bearing located between said support member and said rotatable support, said band bearing comprising a layer of low frictional material, said low frictional material forming a rotational support to permit rotation of said inlet end of said conveying member about said support member;
    a seal, said seal positioned between the junction of said support member and said conveying member to prevent leakage of material between the junction of said support member with said conveying member.

* * * * *